United States Patent [19]

Makosch

[11] 4,358,201

[45] Nov. 9, 1982

[54] INTERFEROMETRIC MEASUREMENT APPARATUS AND METHOD HAVING INCREASED MEASURING RANGE

[75] Inventor: Günter Makosch, Sindelfingen, Fed. Rep. of Germany

[73] Assignee: International Business Machines Corporation, Armonk, N.Y.

[21] Appl. No.: 160,247

[22] Filed: Jun. 17, 1980

[30] Foreign Application Priority Data

Jun. 22, 1979 [DE] Fed. Rep. of Germany ....... 2925117

[51] Int. Cl.$^3$ .............................................. G01B 9/02
[52] U.S. Cl. .................................. 356/351; 356/357; 356/358
[58] Field of Search ............... 356/351, 354, 355, 356, 356/357, 358, 353

[56]  References Cited

U.S. PATENT DOCUMENTS

| | | | |
|---|---|---|---|
| 3,561,876 | 2/1971 | Hoffman | 356/351 |
| 3,666,371 | 5/1972 | de Lang | 356/373 |
| 3,958,884 | 5/1976 | Smith | 356/351 |
| 4,298,283 | 11/1981 | Makosch et al. | 356/351 |

FOREIGN PATENT DOCUMENTS 717233 10/1954 United Kingdom .

OTHER PUBLICATIONS

Makosch et al, IBM Technical Disclosure Bulletin, vol. 15, No. 4, (Sep. 1972), "Measuring the Flight Height of Magnetic Heads on Magnetic Discs".

Primary Examiner—Bruce Y. Arnold
Attorney, Agent, or Firm—Ronald L. Drumheller

[57]  ABSTRACT

In an interferometer wherein there is provided means for directing two linearly polarized beams having their polarizations perpendicular to each other onto a surface at different angles of incidence and means for recombining the beams reflected from the object into a combined beam, the improvement wherein means for periodically varying the phase of one component of the combined beam is provided and wherein the amount of change in phase between the two component beams of the combined beam when an amplitude sensing means senses a maximum or a minimum amplitude is a measure of the topographic height variations of the object surface which is irradiated.

1 Claim, 2 Drawing Figures

INTERFEROMETRIC MEASUREMENT APPARATUS AND METHOD HAVING INCREASED MEASURING RANGE

DESCRIPTION

1. Technical Field

The invention relates to a method of making interferometric measurements having increased measuring range as well as to an arrangement for implementing the method.

2. Background Art

Measurement of surface structures by optical interference methods such as measurement of the roughness of semi-finished or finished surfaces or measurement of profile heights of semiconductor wafers yield unequivocal results only in cases where the height difference between two adjacent distinguishable points does not exceed half the wavelength of the light used ($\lambda/2$). Such a limitation is generally of little or no significance when testing relatively large surface areas or areas with relatively great radii of curvature. However, when step heights exceed $\lambda/2$ and when peak-to-valley heights in microscopic surface areas are to be measured, the measurement values are no longer unequivocal so that it is frequently either not possible to use an interferometer at all or else it must be used with additional measuring instruments. This disadvantage is eliminated in part by multi-color interferometry, which is described, for example, in "Optical Interferometry" by M. Fracon (Academic Press 1966) at pp. 79 et seq., whereby measurements are made using beams having two or more discrete spectral components. Interference line patterns are then evaluated by considering only those lines of one component which coincide with interference lines associated with another spectral component. The evaluation of such measurements is particularly complicated and many errors can be made when the tests are performed over a very large measuring range. To obtain a large measuring range, the individual spectral components must be closely adjacent to each other, so that the coinciding interference lines associated with two or more spectral components change only very slowly. This produces an interference line field which consists of groups of adjacent and/or overlapping interference lines, which makes it difficult, if not impossible, to unequivocally determine which interference lines in the field have optimum spatial coincidence with interference lines associated with another spectral component. For this reason it is generally not possible to automatically evaluate interference line fields.

SUMMARY OF THE INVENTION

It is the object of this invention to provide an interference method and apparatus in which the range over which unequivocal measurements may be carried out at the necessary degree of accuracy is increased by several powers of ten over known methods using monochromatic light.

A further object is to manually or automatically increase the measuring range in steps by orders of magnitude or powers of ten. This is essential for many applications, since an increasing measuring range generally requires a sacrifice in resolution.

It is yet a further object to provide apparatus and a method which permits automatic evaluation at a particularly high resolution even for the greatest measuring ranges.

These objects have not been achieved, even approximately, by any previously known methods. The present invention has the further advantages that it is of very simple design, that it is easy to use, that it has a high degree of accuracy, and that it may be controlled to change the measuring range, either automatically or under the control of a program. In addition, the invention is particularly advantageous for automatic evaluation of measurements.

BRIEF DESCRIPTION OF THE DRAWINGS

The invention will be described in detail below with reference to the accompanying drawings in which.

DESCRIPTION OF THE PREFERRED EMBODIMENTS

Figure 1:
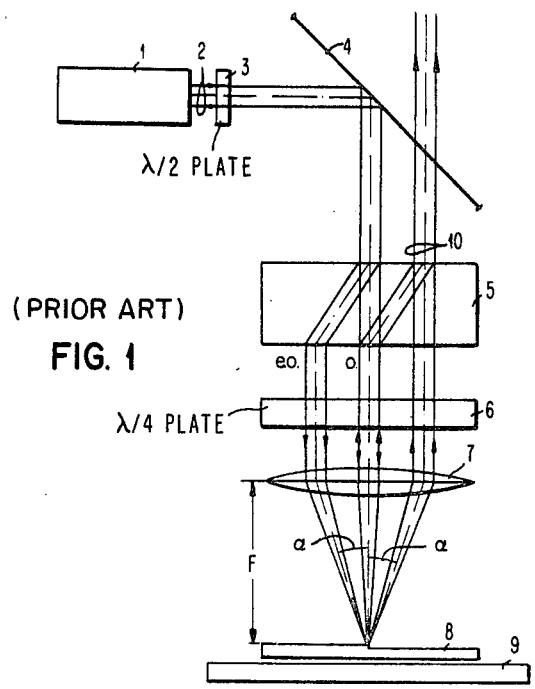
FIG. 1 is an embodiment of a prior art apparatus.

The prior art arrangement shown in FIG. 1 consists of a light source 1, preferably a laser, for generating a linearly polarized beam 2, a $\lambda/2$ plate 3, a partially reflecting mirror 4, a birefringent crystal 5, a $\lambda/4$ plate 6, a lens 7, and a support 9 carrying an object 8. The plane of polarization of the linearly polarized beam 2 emanating from the light source 1 is suitably rotated in the $\lambda/2$ plate 3 and is deflected at the partially reflecting beam splitter 4 in the direction of the birefringent crystal 5. The linear polarization of the beam is oriented such that in the birefringent crystal it is split into an ordinary and an extraordinary beam o and eo, respectively, which leave the crystal displaced from but parallel to each other. The lens 7 is arranged in such a manner that it is passed by the ordinary beam o in the area of its optical axis and by the extraordinary beam eo in its peripheral area, so that both beams are focussed on and superposed at the upper surface of the object 8, which lies approximately in the focal plane of the lens.

At the upper surface of the object 8, the normally incident ordinary beam o is reflected back onto itself, whereas the obliquely incident extraordinary beam eo is reflected back to the lens symmetrically to the optical axis. Since the beams pass the $\lambda/4$ plate 6 twice, their direction of polarization upon entry into the birefringent crystal 5 is rotated by 90° relative to the direction of polarization of the beams originally leaving the crystal. As a result, the ordinary beam o reflected at the upper surface of the object 8 passes the birefringent crystal 5 as an extraordinary beam during its second pass, being deflected in the process, whereas the original extraordinary beam eo reflected at the upper surface of the object 8 symmetrically to the optical axis passes the birefringent crystal as an undeflected ordinary beam. Upon leaving the upper face of the birefringent crystal, both beams are thus combined into an interference beam 10 consisting of two components polarized perpendicularly to each other, said beam 10 being subsequently used, in a manner not shown, to generate an interference line field. The vertical position of the object's upper surface region being irradiated by the two beams is measured as a phase difference of the two components. If the reflecting upper surface is completely flat and located in the focal plane of the lens 7, then the phase difference occurring between the two components equals zero. A vertical position (height)

change of the object by $\Delta h$ results in a phase difference between the two components of $$\Delta\phi = \frac{4\pi}{\lambda} \Delta h(1 - \cos\alpha) \qquad (1)$$

where $\lambda$=light wavelength, $\Delta h$=height change (step height), and $\alpha$=angle of incidence of extraordinary beam. To ensure unequivocal measurements, the condition $$\alpha\phi < 2\pi \qquad (2)$$

must be fulfilled, which is tantamount to the requirement $$\Delta h < \frac{\lambda}{2(1 - \cos\alpha)} \qquad (3)$$

By suitably selecting the angle of incidence $\alpha$, this condition can be fulfilled for each arbitrary value $\Delta h$. The angle of incidence $\alpha$ can be made arbitrarily small by suitably selecting the distance between the ordinary and extraordinary beams which results from splitting in the birefringent crystal and/or the focal length F of the lens 7. By changing the angle $\alpha$, the measuring range can be arbitrarily increased or decreased without affecting the unequivocalness of the measurements. According to (1), the height difference $\Delta h$ is given by $$\Delta h = \frac{\lambda \Delta\phi}{4\pi(1 - \cos\alpha)} \qquad (4)$$

It is obvious that the measuring range is an inverse function of the angle $\alpha$. If the lens 7 is replaced by another collecting or beam combining element, for example by a mirror, then the phase difference between the two beams must be referenced or set to zero, or a particular reference position of the object face must be chosen as the zero point.

Figure 2:
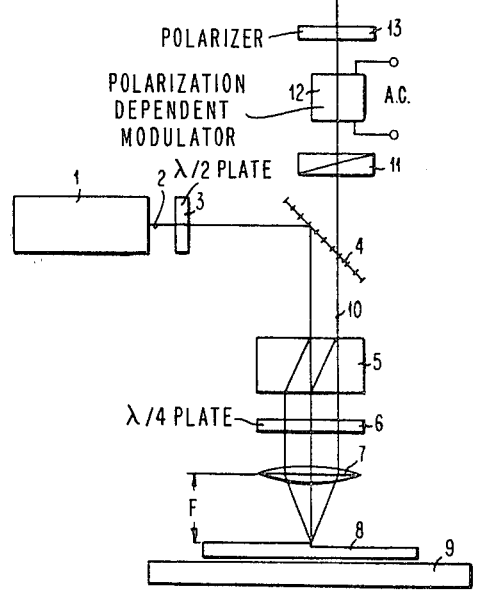
FIG. 2 is an automatic interferometric measuring embodiment of the invention which has a particularly high resolution.

FIG. 2 shows an embodiment of the invention and contains the arrangement shown in FIG. 1. In view of this, a description of the parts designated as 1 to 10 has been omitted.

Beam 10 leaves crystal 5 after its second pass, passes the beam splitter 4 (which may be a grating or partially reflecting mirror, for example) and reaches a compensator 11, by means of which, for example, the zero position is set. Then the beam passes a polarization-dependent modulator 12, in which the phase of a component polarized in one direction is gradually and periodically varied by $\lambda/2$ relative to the phase of the other component polarized perpendicularly to that direction. For a completely flat upper surface of the object 8 arranged perpendicularly to the optical axis of the lens 7, compensator 11 may be used to set a phase difference of zero between the two perpendicularly polarized components of the beam 10. The periodic variation of the phase difference between the two polarization components by the modulator 12 then periodically varies the polarization state of the beam leaving said modulator from linearly polarized in one direction, via elliptically and circularly polarized to linearly polarized in a direction perpendicular thereto, and vice versa. Polarizer 13 passes the portion of the beam having a corresponding polarization, which portion the modulator 12 causes to vary sinusoidally between a minimum and a maximum intensity.

Polarizer 13 may be oriented with the modulator 12 de-energized such that the maximum (or minimum) intensity passes the polarizer 13 at the particular phase difference between the two components of the beam 10. At a phase difference differing therefrom by $\lambda/2$, the passing intensity would instead be at the minimum (or maximum). If the upper surface of the object 8 changes the phase difference between the component beams, for example because of the step disturbance illustrated in the two figures, then the polarizer 13 passes the maximum (or minimum) intensity only when the modulator 12 compensates for the phase difference change generated by the disturbance. Since the phase shift caused by the polarization-dependent modulator 12 is a linear function of the energizing AC voltage, it is possible for a simple circuit to monitor the voltage occurring at an output terminal 15 of a photodetector 14 following polarizer 13 and the voltage energizing the modulator 12, in order to measure and store the amplitude of the modulator energizing voltage which completely compensates the change in phase difference caused by the disturbance. Since the phase difference change is compensated when the signal at terminal 15 is at a maximum (or minimum), the amplitude of the modulator control voltage at such time is a measure of the change in phase difference caused by the disturbance in the upper surface of the object and consequently also is a measure of the magnitude of the disturbance in the upper surface. Thus, the exact magnitude of the disturbance on the measured surface can be determined to a high degree of accuracy and within a few microseconds.

In addition to an indispensable increase in the measuring range, this invention also offers the special advantage that the measuring range can be adapted to special requirements by suitable control means and, if necessary, it may even be controlled by a program. It replaces with only one measuring step the previously used two step measuring techniques, such as for example where a coarse measurement was carried out by mechanical means followed by an interferometric fine measurement. A further advantage is that the invention can be easily combined with other methods and arrangements which permit measuring results to be obtained automatically and at extremely high speeds.

Having thus described my invention, what I claim as new, and desire to secure by Letters Patent is:

1. Interferometric measurement apparatus having an increased measurement range, comprising:
   means for splitting a measuring beam into two linearly polarized beams laterally spaced from each other, wherein said beams are linearly polarized perpendicularly to each other;
   means for directing said beams onto an object surface at different angles of incidence, said beams thus experiencing a shift in phase with respect to each other which is a function of the topographic height variations of the object surface which is irradiated;
   means for combining said beams after interaction with the object surface to produce a combined beam;
   means (12) for periodically varying the phase relationship between said two beams; and
   means (13,14,15) for sensing the amplitude of the component portion of the combined beam which is linearly polarized in a predetermined direction, wherein the amount of change in the phase relationship between said two beams caused by said phase varying means when said amplitude sensing means senses a maximum or minimum amplitude is a measure of the topographic height variations of the object surface which is irradiated.

* * * * *